UNITED STATES PATENT OFFICE.

ERNST KÖNIG, OF HÖCHST-ON-THE-MAIN, GERMANY, ASSIGNOR TO THE FARB-WERKE, VORMALS MEISTER, LUCIUS & BRÜNING, OF SAME PLACE.

BASIC YELLOW DISAZO DYE.

SPECIFICATION forming part of Letters Patent No. 602,638, dated April 19, 1898.

Application filed May 6, 1897. Serial No. 635,397. (Specimens.)

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of a Yellow Dyestuff, of which the following is a specification.

This invention relates to a yellow basic disazo dyestuff obtained by the action of diazotized meta-trimethyl ammonium phenyl-azo-meta-toluidin upon 1 phenyl, 3 methyl, 5 pyrazolon.

The reaction is set out in the following equation:

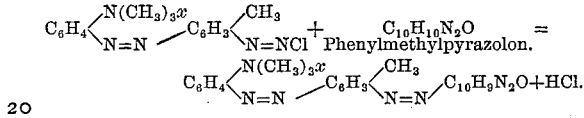

$x$ in this equation means chlorin or an equivalent radical of an acid.

The process is, for instance, as follows: 47.7 kilos of the zinc chlorid double salt of meta-trimethyl ammonium phenyl-azo-meta-toluidin hydrochlorid are dissolved in about one thousand liters of water and diazotized at 10° to 15° centigrade by the addition of twenty kilos of hydrochloric acid of 20° Baumé and 6.9 kilos of acetate of sodium. This diazo solution is then run into an aqueous solution of 17.4 kilos of 1 phenyl, 3 methyl, 5 pyrazolon, and ten kilos of calcined soda. A sticky gelatinous yellow paste results. When heated, the mass becomes liquid by the addition of acetic acid. The dyestuff is precipitated with common salt from the hot filtered solution.

The dyestuff thus obtained exhibits the following properties: It forms an orange-yellow powder easily soluble in water with a yellow color. This solution turns yellow red on addition of soda. Soda-lye changes it to cherry red. Hydrochloric acid does not change its color, but precipitates the dyestuff. It is soluble in alcohol, ether, and benzene, insoluble in petroleum ether, and soluble in concentrated sulfuric acid with a carmin-red color.

The new dyestuff dyes tanned and untanned cotton, as well as half-wool, evenly in an acid-bath.

Having thus described my invention, I claim as new and desire to secure by Letters Patent—

As a new product, the yellow dyestuff obtained from diazotized meta-trimethyl ammonium phenyl-azo-meta-toluidin and 1 phenyl 3 methyl 5 pyrazolon, being an orange-yellow powder, soluble in water, alcohol, ether and benzene; insoluble in petroleum ether, dyeing tanned and untanned cotton as well as half-wool yellow in an acid-bath, substantially as set forth.

In testimony that I claim the foregoing as my invention I have signed my name in presence of two subscribing witnesses.

ERNST KÖNIG.

Witnesses:
HEINRICH HAHN,
ALFRED BRISBIN.